United States Patent
Kim

(10) Patent No.: US 7,430,186 B1
(45) Date of Patent: Sep. 30, 2008

(54) SPATIAL-DRIVEN CONTEXT ZONES FOR SENSOR NETWORKS AND DEVICE INFRASTRUCTURES

(75) Inventor: Andrew Kim, Paramus, NJ (US)

(73) Assignees: International Business Machines Corporation, Armonk, NY (US); Institute For Information Technology Advancement, Daejeon (KR)

( * ) Notice: Subject to any disclaimer, the term of this patent is extended or adjusted under 35 U.S.C. 154(b) by 0 days.

(21) Appl. No.: 11/957,225

(22) Filed: Dec. 14, 2007

(51) Int. Cl.
*H04Q 7/00* (2006.01)
(52) U.S. Cl. .................. 370/328; 455/16; 455/502; 455/503; 455/519; 340/539.22; 340/572.1; 370/312; 370/432; 370/338; 370/475; 370/473
(58) Field of Classification Search .............. 455/16, 455/502, 503, 519; 370/328, 312, 432, 338, 370/475, 473; 340/539.22, 572.1
See application file for complete search history.

(56) References Cited

U.S. PATENT DOCUMENTS

| | | | |
|---|---|---|---|
| 4,124,848 A | 11/1978 | Clark et al. | |
| 4,459,689 A | 7/1984 | Biber | |
| 5,463,595 A | 10/1995 | Rodhall et al. | |
| 5,966,074 A | 10/1999 | Baxter | |
| 6,186,908 B1 | 2/2001 | Kawasaki et al. | |
| 6,307,475 B1 | 10/2001 | Kelley | |
| 6,317,040 B1 | 11/2001 | Ikeda | |
| 6,415,205 B1 | 7/2002 | Myron et al. | |
| 6,420,973 B2 | 7/2002 | Acevedo | |
| 7,005,981 B1 | 2/2006 | Wade | |
| 7,106,193 B2 | 9/2006 | Kovach | |
| 7,242,294 B2 | 7/2007 | Warrior et al. | |
| 7,254,372 B2 * | 8/2007 | Janusz et al. | 455/88 |
| 7,280,040 B2 | 10/2007 | Devaul | |
| 2003/0202479 A1 * | 10/2003 | Huang et al. | 370/252 |

(Continued)

FOREIGN PATENT DOCUMENTS

JP 2005-011057 1/2005

OTHER PUBLICATIONS

Akyildiz, I.F., et al., "Wireless Sensor Networks: A Survey Revisited".

(Continued)

*Primary Examiner*—Rafael Pérez-Gutiérrez
*Assistant Examiner*—Kwasi Karikari
(74) *Attorney, Agent, or Firm*—Scully, Scott, Murphy & Presser, P.C.; Lisa M. Yamonaco, Esq.

(57) ABSTRACT

An apparatus, method and computer readable device for providing spatial information in a sensor network. The sensor network comprises a plurality of sensors and a plurality of actuators, each sensors and actuators have a unique id and a known spatial location within a spatially-bounded zone and a database is provided for storing the location each sensor and actuator. A spatial-processor generates a plurality of context zones based upon the information contained in the location database to provide actuator coverage for the spatially-bounded zone. Each context zone is generated by assigning a subset of the plurality of sensors as a spatial boundary of each context zone and by deploying a subset of the plurality of actuators into one or more context zones. In operation, the spatial-processor determines if an actuator has failed in context zone and redeploys one or more actuators from another intersecting context zone to the context zone containing the non-operational actuator.

2 Claims, 2 Drawing Sheets

U.S. PATENT DOCUMENTS

| | | | |
|---|---|---|---|
| 2004/0100394 A1 | 5/2004 | Hitt | |
| 2005/0080601 A1* | 4/2005 | Wren | 703/2 |
| 2005/0231353 A1 | 10/2005 | DiPoala et al. | |
| 2005/0248454 A1 | 11/2005 | Hanson et al. | |
| 2005/0248456 A1 | 11/2005 | Britton, Jr. et al. | |
| 2005/0285740 A1* | 12/2005 | Kubach et al. | 340/572.1 |
| 2006/0055552 A1 | 3/2006 | Chung et al. | |
| 2006/0192666 A1 | 8/2006 | Parker et al. | |

OTHER PUBLICATIONS

Chatzigiannakis, I., et al., "An Adaptive Power Conservation Scheme for Heterogeneous Wireless Sensor Networks with Node Redeployment," Proceedings of the seventeenth annual ACM symposium on Parallelism in algorithms and architectures, Las Vegas, Nevada, USA, Session: Sensor networks and ad hoc networks table of contents, pp. 96-105, Year of Publication: 2005; and.

Cerpa, A., "ASCENT: adaptive self-configuring sensor networks topologies," in: Mobile Computing, IEEE Transactions, Publication Date: Jul.-Aug. 2004, vol. 3, Issue: 3, pp. 272-285.

Chatzigiannakis(2), I., et al., "Efficient and Robust Data Dissemination using Limited Extra Network Knowledge," Conference on Distributed Computing in Sensor Networks (2006).

Kulik, J., et al., "Adaptive Protocols for Information Dissemination in Wireless Sensor Networks," International Conference on Mobile Computing and Networking, Proceedings of the 5th annual ACM/IEEE international conference on Mobile computing and networking, Seattle, Washington, USA, pp. 174-185, Publication: 1999.

Huang, Q., et al., "Spatiotemporal Multicast in Sensor Networks," Conference On Embedded Networked Sensor Systems, Proceedings of the 1st international conference on Embedded networked sensor systems, Los Angeles, California, USA, Session: Dissemination, pp. 205-217, Year of Publication: 2003.

Chatzigiannakis(3), I., et al., "A Forward Planning Situated Protocol for Data Propagation in Wireless Sensor Networks based on Swarm," —rul.cti.gr. Copyright is held by the author/owner. SPAA'05, Jul. 18-20, 2005.

* cited by examiner

SPATIAL-DRIVEN CONTEXT ZONES FOR SENSOR NETWORKS AND DEVICE INFRASTRUCTURES

BACKGROUND OF THE INVENTION

1. Field of the Invention

The present invention generally relates to sensor networks, more particularly, to an apparatus, method and computer program storage device for forming one or more context zones within a spatial-bounded region based upon spatial information in a sensor network.

2. Description of the Prior Art

Large numbers of computerized sensor and actuator devices are increasingly being deployed and networked, both wired or wirelessly connected to one another to form so-called sensor networks. In a sensor network, sensor device are typically deployed to monitor such events as temperature, pressure and acidity levels in a industrial/business or consumer process while actuators are deployed to control the process such as values, heaters, and coolers. Moreover, sensor and actuators are network connecting one or more sensors with one or more actuators to provide an infrastructure resulting in smart environmental solutions in such diverse applications as industrial automation, asset management and smart offices/living spaces. For example, in a conventional industrial, or a conventional business application, a sensor network might include hundreds of individual sensor and actuator devices where each device may be relatively simplistic, playing a relatively narrow role in the overall sensor network.

Management of sensor networks which include a large number of sensor and actuator devices in conventional industrial/business application typically involves controlling each device at a per-device level or by grouping sensors and actuator devices into heterogeneous sets of devices based upon their respective functions. As the numbers of sensor and actuator devices increase into the hundreds or thousands it becomes increasingly difficult to effectively mange each sensor and actuator device at a per-device or per-function level in a sensor network.

Having set forth the limitations of the prior art, it is clear that what is required is a method, system or computer program storage device capable of managing sensors and actuator devices in a sensor network to enable administrators of sensor networks to form logical abstraction layering of sensor and actuator devices to employ new device management functionality and to allow the development of further high level business solutions in smart environments.

SUMMARY OF THE INVENTION

It is therefore an object of the present invention to provide an apparatus, method and computer program storage device for forming one or more context zones within a spatial-bounded region based upon spatial information in a sensor network.

An additional object of the present invention is to provide a sensor network including a plurality of sensors and a plurality of actuators, each sensor and actuator having a unique id and a known spatial location information (e.g. relative to a coordinate system) within a spatially-bounded zone. The sensor network further includes a location database for storing the location of each sensor and actuator. A spatial-processing device receives spatial information and generates a plurality of context zones based upon the information contained in the location database to provide actuator coverage for the spatially-bounded zone. Each context zone is generated by assigning a subset of the plurality of sensors as a spatial boundary of each context zone and by deploying a subset of the plurality of actuators into one or more context zones.

An additional object of the present invention is to further provide the spatial-processor with a rules engine for determining if each said one or more context zones has actuator coverage based upon a configuration table and an operational status of each said plurality of actuators deployed to each said context zone and a context zone intersect detector for determining if the boundaries of each said plurality of context zones intersect overlap, wherein, if one said plurality of actuators in said one or more said plurality of context zones is determined non-operational, said spatial-processor shall redeploy one or more actuators from another intersecting context zone to the context zone containing the non-operational actuator.

Another additional object of the present invention is to provide that each of the plurality of actuators receives zone update information from the spatial-processor detailing the actuator's deployment.

In yet another object of the present invention the spatial processor generates said plurality of context zones based on location of a plurality of location aware sensors including an array of similar-in-function devices that are embedded through said spatially-bounded region.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Hereinafter, embodiments of the present invention will be described in detail with reference to the accompanying drawings.

Figure 1:
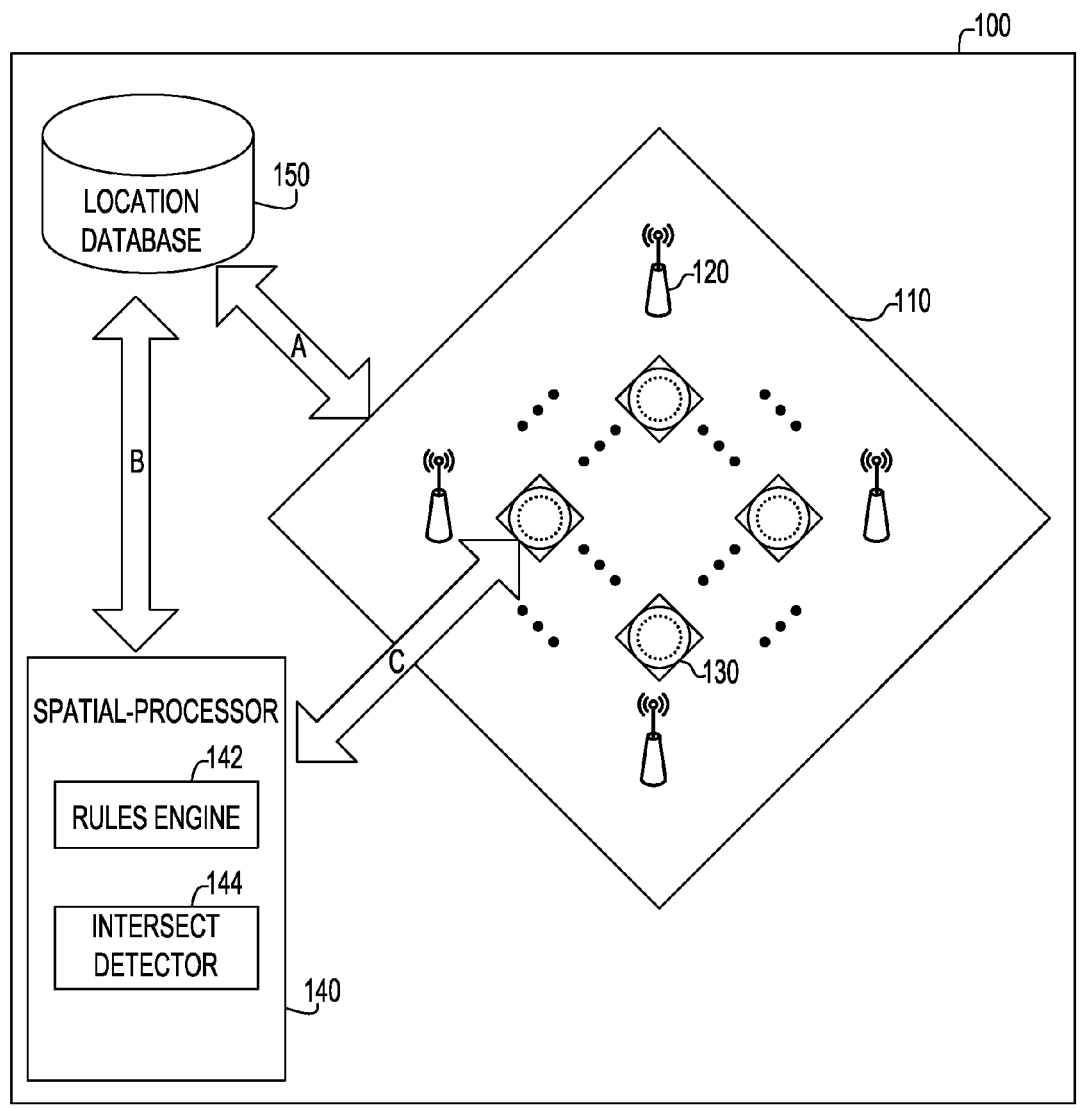
FIG. 1 is an illustration of an apparatus for providing spatial information in a sensor network in accordance with one possible embodiment of the present invention.

FIG. 1 illustrates an apparatus for providing spatial information in a sensor network 100 in accordance with one possible embodiment of the present invention. As can be seen in FIG. 1, a plurality of sensors 120 and actuators 130 are provided in a spatial-bounded zone 110. The number of sensors 120 and actuators 130 are not limited to the number shown in FIG. 1 but can be any number based upon the ranges and individual limitations of such devices as known to those skilled in the art. Moreover, sensors 120 and actuators 130 can be placed in a fixed array pattern or any other deployment pattern as known to those skilled in the art. Additionally, sensor can be hard wired to one another over a traditional TCP/IP local area network using such wired connections as a traditional RJ45 connections or various wireless connections using such standards as WIFI, Bluetooth®, or Zigbee. Similarly, actuators can utilize similar connections means.

Each sensor 120 and actuator 130 is provided with a unique identifier (ID) by a device manufacturer or, can be configured during deployment with a unique ID and installed into a specific spatial location within the spatially-bounded zone 110. A location database 150 is provided for storing the location information of each sensor 120 and actuator 130 at relative coordinates within the spatial-bounded zone 110. Moreover, each sensor 120 and actuator 130 is capable of communicating with location database 150 as denoted by arrow A. The sensor and actuator IDs and location information can, for example, be stored as metadata in location database 150 as known to those skilled in the art.

Figure 2:
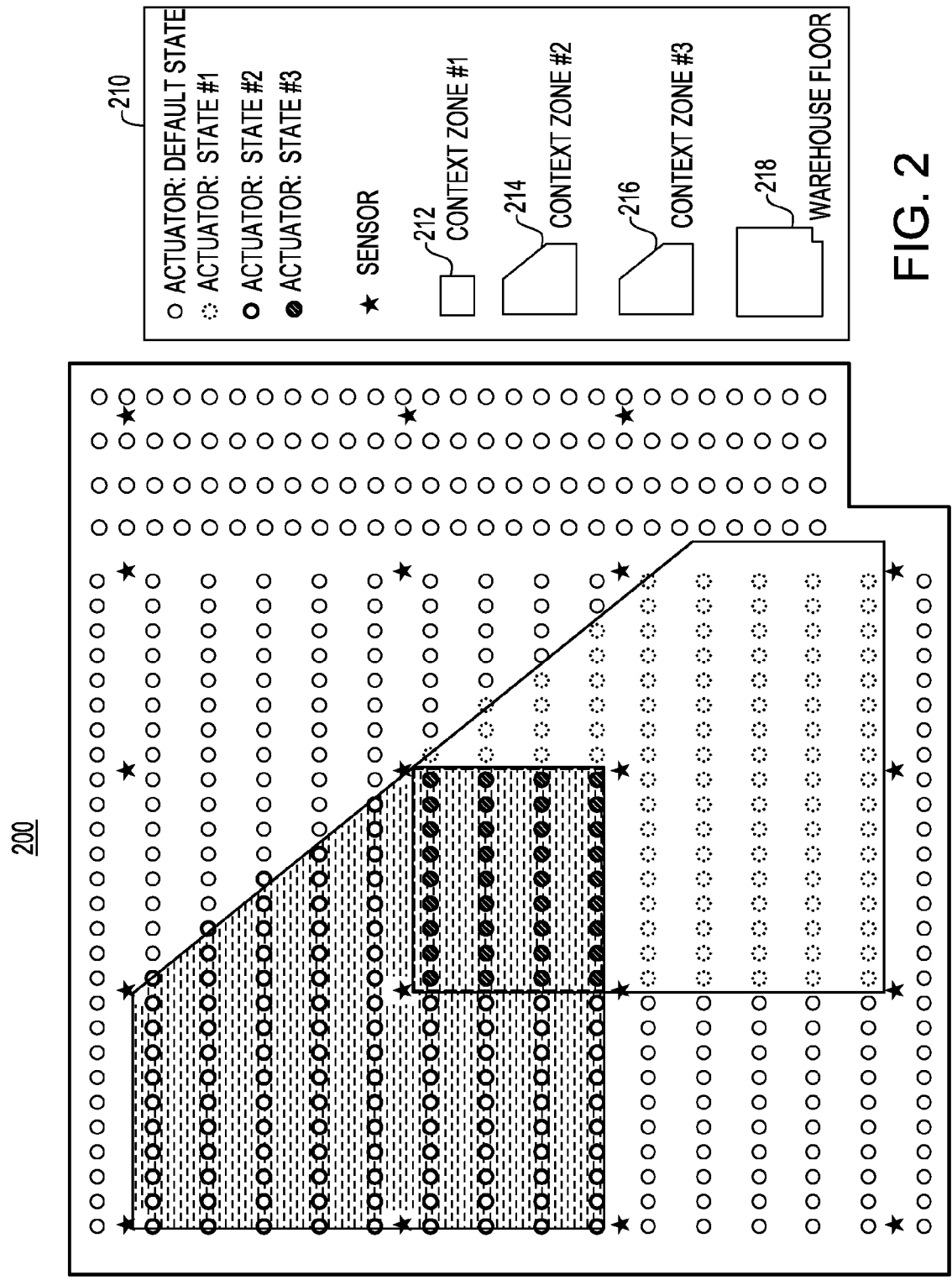
FIG. 2 is an illustration of a method of assigning sensors and deploying actuator to a plurality of context zones in accordance with one possible embodiment of the present invention.

A spatial-processor 140 is provided executing middleware or programs for generating a plurality of context zones 212-218 as shown in FIG. 2, based upon the information contained in the location database 150. The spatial-processor 140 computes a "scene graph" of the physical layout of sensors and a context zones. A scene graph is a data structure commonly used by vector-based graphics editing applications and modern computer games. The main function of spatial-processor 140 is to calculate the geometric bounds of the zones based on the sensors and to detect collisions, such as intersections, overlaps and boundaries of a context zones. The spatial-processor 140 will periodically compute context zones based upon movement of a context zone. For example, updated data received from varying sensor data can cause the spatial-processor 140 to move, grow or shrink a context zone.

The spatial-processor 140 write to the location database 150 to store context zone information as denoted by arrow B. In addition, spatial-processor 140 can update individual actuators 130 of their respective deployment and the spatial-processor 140 can receive can receive information as to the operational status of individual actuators 130 as denoted by arrow C.

The spatial-processor 140 includes a rules engine 142 for determining actuator coverage 142 and a context zone intersect detector 144 for determining if the boundaries of each context zone intersect or overlap. If an actuator 130 in a context zone is determined to be non-operational, the spatial-processor 140 can redeploy one or more actuators from another intersecting context zone to the context zone containing the non-operational actuator. Moreover, as explained below, the spatial-processor 140 provides a layered architecture such as having multiple context zones, which overlap and can aid infrastructure and device developers in utilizing multiple sensors and actuators.

FIG. 2 is an illustration of a method of assigning sensors and deploying actuators to a plurality of context zones in accordance with one embodiment of the present invention. In FIG. 2, a sensor network is implemented in a warehouse scenario as shown in sensor map 200 which is a hypothetical warehouse floor 218 as indicated in legend 210.

A legend 210 is provided with an explanatory list of the symbols used in sensor network map 200. As can be seen in the legend 210 and sensor network map 200, actuators are depicted in four different states with four different symbols provided to represent the state of the actuator; a default state ◯, a state #1 ∴, a state #2 ●, and a state #3 ●. Additionally, sensors are depicted in the legend 210 and sensor network map 200 as a star ★. In FIG. 2, sensors ★are dispersed through warehouse floor 216 and form a boundary for context zone #1-3 (212-216), which are depicted in legend 210 as geometric shapes relative to the context zones depicted in sensor network map 200.

In operation, the present invention creates one or more context zones by employing the spatial-processor 140 illustrated in FIG. 1. For example, as shown in FIG. 2, in the example of a warehouse scenario describes, spatial-processor 140 subscribes to listen to a plurality of (i.e. nineteen) sensors ★dispersed throughout the warehouse floor 218. The spatial-processor 140 accesses metadata stored in the location database to assign sensors ★to a specific context zone. For example, context zone #1 212 is formed in the geometric shape of a triangle by four sensors ★, while context zone #2 214 and context zone #3 216 are formed by six sensors ★and are form two identical polygons.

After assigning sensors ★as boundaries for each context zones, the spatial-processor 140 deploys actuators to each context zone by transmitting zone update information to each actuator. For example, in FIG. 2, a default state ◯indicates that the actuator is not in a context zone, while state #1 ∴indicates that an actuator is in context zone #2 214, state #2 ●indicates that the actuator is deployed in context zone #3 216, and state #3 ●indicates that the actuator is in context zone #1 212. The number of actuator states is not limited to this particular embodiment and can be any number of states depending on the number of context zones.

The method as described above in reference to FIG. 2 can be summarized as follows: First, a spatial-processing engine subscribes to listen to one or more sensors which are reading events published by one or more actuators; Second, an array of sensors publishes events (individually), which contain information regarding the sensor's reading, a time stamp, and a sensors ID; Third, the spatial-processing engine's rule engine is inputted with the data from one or more sensors (data stream) and identifies all abnormal sensor data by that sensor's ID; Fourth, the spatial-processing engine then uses the rule engine's output to calculate the spatial boundary of that individual sensor which could be manipulated into multiple context zones as explained below by the spatial processor; Fifth, the spatial-processing engine then queries all actuators, context zones to determine the intersections of each context zone. For example, if a context zone is detected to intersect or contained in one zone, the spatial-processing engine will then poll the rules engine to determine whether or not a composite zone should be created. If the rules engine determined the need for the composite zone it is created and added to the location database. Accordingly, if an actuator is found to be within the bounds of a context zone, an event is sent to the actuator (or the actuator's controller) containing information regarding the zone's type and the actuator responds to the event.

In a further aspect of the invention, the spatial processor 140 derives "contextual meaning zones" based on location aware sensors metadata whereas an array of similar-in-function devices that are embedded through in a physical infrastructure (a/k/a sensor network), such as a temperature sensor, can be used to compose/generate conceptual, spatially-bounded zones. For example, ten separate temperature sensors in an infrastructure might read that the temperature is above 45 Celsius. Based upon the reported location information of each of the ten sensors, a geometric algorithm, which can also take into account the physical layout of the infrastructure, can generate the bounds and meaning of a "contextual zone". In this case, this zone's meaning could be set to "Not Human Safe".

The spatial processor 140 further is adapted to form three distinct contextual zones: static, dynamic, and composite. In a "static zone," the physical infrastructure has inherent zones (rooms, etc), which can be predefined. These static zones can have multiple contextual meanings, such as "room"+"conference room". A physical space might inherit multiple functionalities or business rules based on multiple "contextual meaning zones" that overlap the space. However, it is important to keep in mind that all zones do not have "meaning" to all users (user: office worker vs. maintenance staff).

A "dynamic zone", is composed and generated by the sensor infrastructure middleware located in each device as known to those skilled in the art. A dynamic zone is one which response to changes in the status of actuators wherein if an actuator is non-operational it will withdraw from a context zone by communicating its status to the spatial-processor 140. As described above, in the ten example infrastructure having separate temperature sensors, the aggregated sensor readings coupled with the location information sensor are used to dynamically define these dynamic zones. Based on the middleware's business rules and the sensor data, the "contextual meaning" is also assigned.

A "composite zone," provides both dynamic and static zones that are derived from the readings of sensors. However, composite zones are composed via the spatial/geometric overlap/intersection of zones. For example, the intersection of a "High Temperature" zone and a "High Levels Gas Detected" zone can be used to generate a "Human Fatal" zone that can be geometrically defined as the intersection (or some customized geometric algorithm) of the two base zones. Composite zones allow for the generation of new zones primarily based upon existing zones, and not only sensor information, which dynamic zones are primarily based upon.

In a further aspect of the present invention, the spatial processor 140 can provide for automated management of the sensor network infrastructure enabling the sensor infrastructure and its contained devices to react to different infrastructure situations. Current sensor infrastructures often isolate certain devices to perform a specific task and it is often too expensive to enable devices to react to the myriad of possible infrastructure events. As discussed above, device middleware can publish location-metadata of the devices to the location database 150 or to the spatial processor 140 to generate, dynamic and static, "contextual meaning zones." The executing middleware can trigger specific device behaviors or publish high-level alerts. The spatial processor 140 can then query for all devices contained within the zone and publish the "contextual meaning alert" to the devices contained within the zone's geometric bounds.

The present invention as described above provides a sensor network architecture, which provides a human-centric/intuitive method of defining device/infrastructure state changes in a sensor network. By generating zones based upon spatial infrastructure data, sensor location metadata, and geometric algorithms, the architecture enables a base sensor/actuator network platform that facilitates implementing and understanding sensor behaviors.

Another benefit of the present invention is related to the layered architecture of the system, and the separation of concerns between infrastructure developers and device developers. This separation of concerns, or logical abstraction layer, eases the maintenance and the evolution of the sensor infrastructure's logical behavior. A device only needs to define what type of zones which it can/must react to and how to react. These reactions definitions may not necessarily be device specific, but can also be defined in a centralized manner "Not Human Safe"→TURN_DEVICE_OFF & "High Temperature"→TURN_DEVICE_OFF "Contextual meaning zones" are defined without concern to which type of device may/may-not be contained with in the zone. It is simple a geometric zone that contains a high-level meaning.

The present invention can also be embodied as a program on a computer-readable recording medium. Examples of the computer-readable recording medium include but are not limited to Compact Disc Read-Only Memory (CD-ROM), Random-Access Memory (RAM), floppy disks, hard disks, and magneto-optical disks.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. A sensor network comprising:
a plurality of sensors and a plurality of actuators, each said plurality of sensors and plurality of actuators associated with a known spatial location within a spatially-bounded region;
a database for storing said spatial location information of each said plurality of sensors and plurality of actuators within said spatially-bounded region;
a spatial-processor means for receiving sensor device readings and associated time stamps, said spatial-processor means implementing a rules engine for calculating one or more context zones based upon said location information contained in the location database and said sensor device readings and associated time stamps provided to said spatial-processor from said plurality of sensors to provide actuator coverage for said spatially-bounded region, said spatial processor assigning sensors as physical boundaries defining each one or more context zones;
said rules engine determining if each said one or more context zones has said actuator coverage by determining whether an actuators is deployed to each said context zone, said context zone having an associated subset of said plurality of sensors as a spatial boundary and a subset of said plurality of actuators; and
a context zone intersect detector for determining if the boundaries of each said plurality of context zones intersect or overlap,
wherein, if one said plurality of actuators in said one or more said plurality of context zones is determined non-operational or unassigned to the zone, said spatial-processor redeploying one or more actuators from another intersecting or overlapping context zone to the context zone containing the non-operational actuator.

2. The sensor network of claim 1, wherein each said plurality of actuators receives zone update information from the spatial-processor detailing the actuator's deployment, and generating said plurality of context zones based on the location of a plurality of location aware sensors including an one or more similar devices that are embedded through said spatially-bounded region.

\* \* \* \* \*